March 10, 1942.  E. S. MacPHERSON  2,275,779
GEAR SHIFT CONTROL
Filed May 17, 1939  5 Sheets-Sheet 1

Inventor
Earle S. MacPherson
By
Attorneys

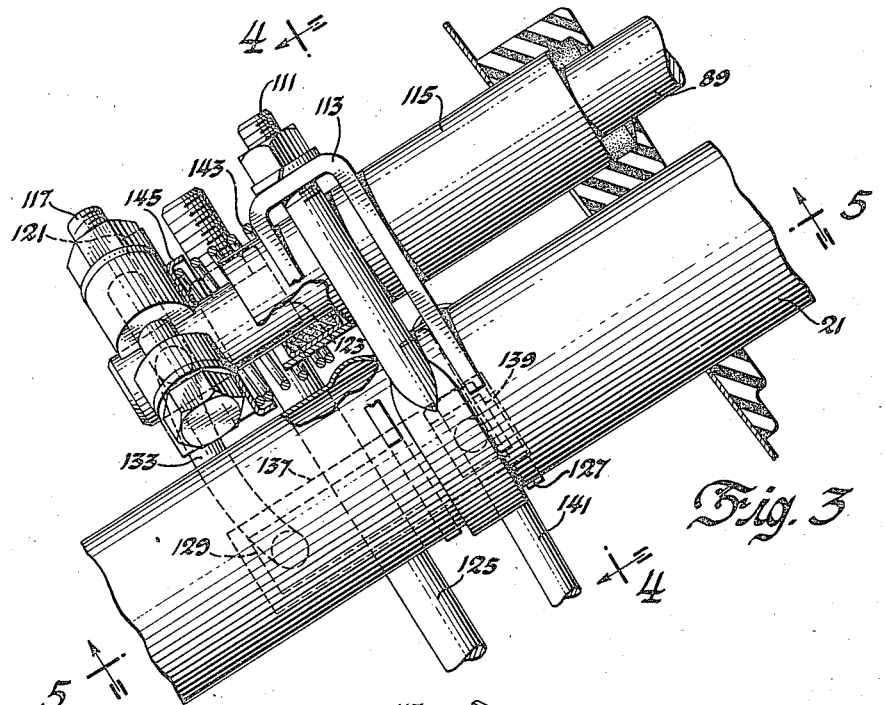

Inventor
Earle S. MacPherson
By Blackmore, Sinner & Oliver
Attorneys

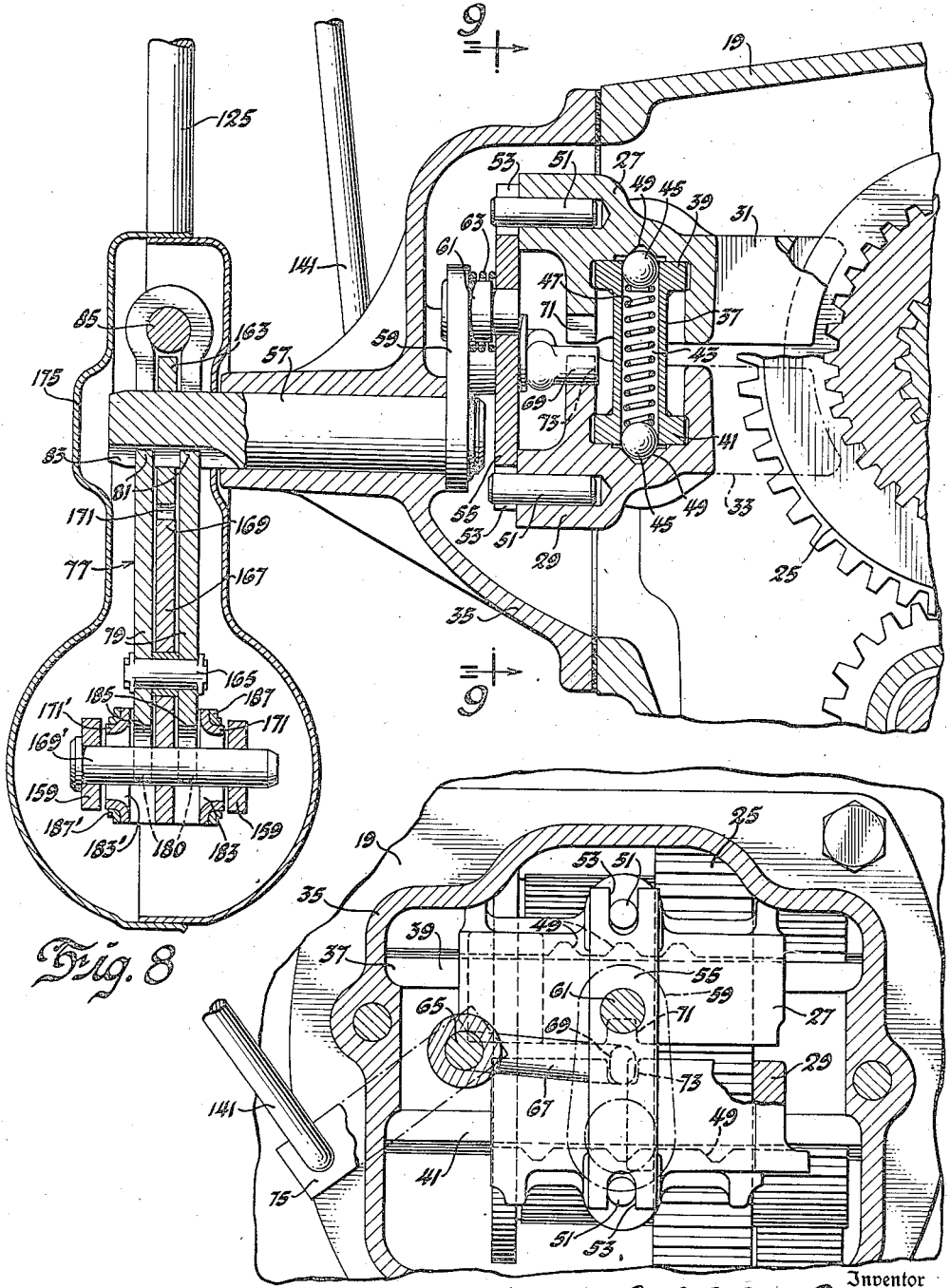

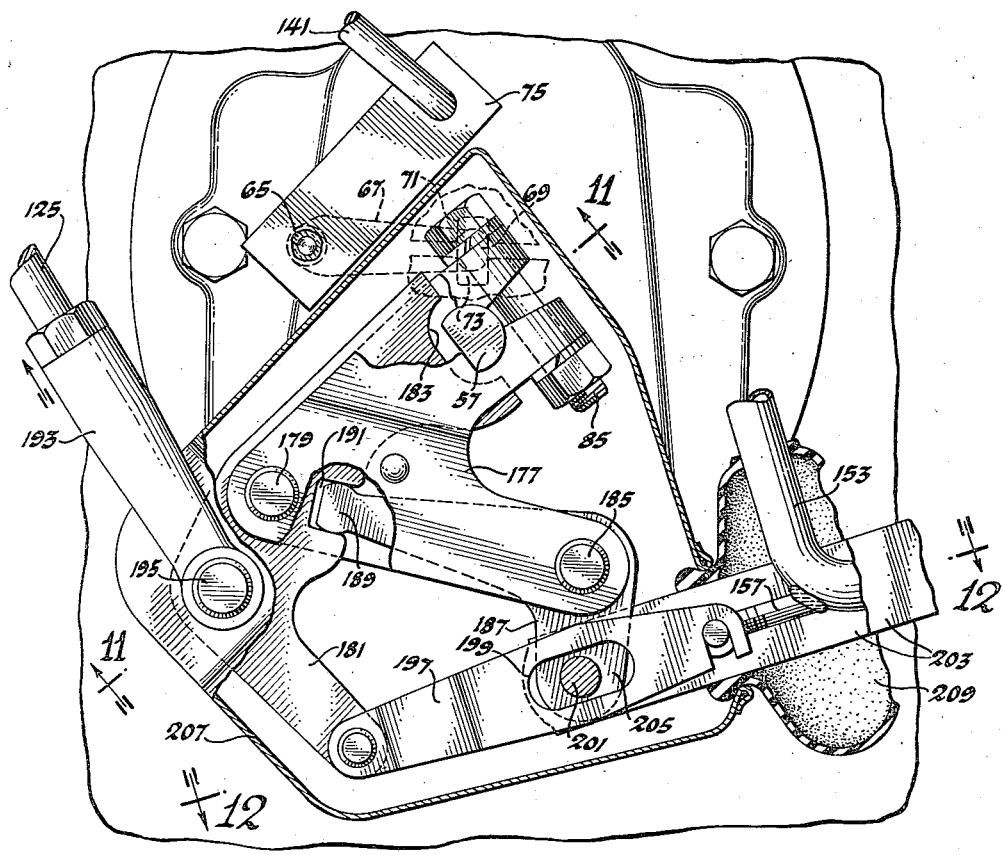
*Fig. 10*
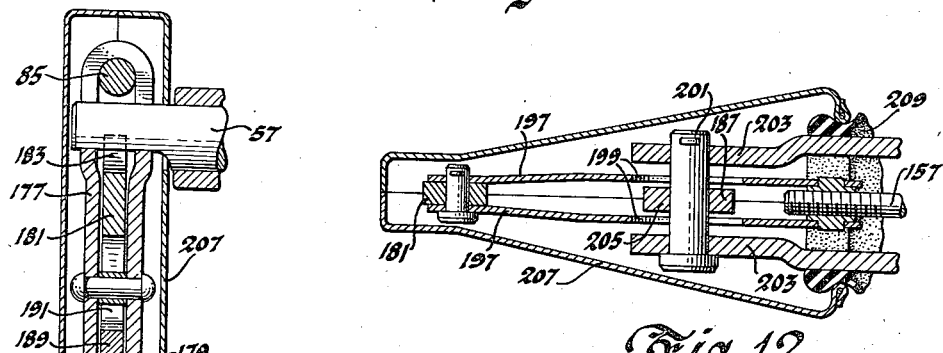
*Fig. 11*  *Fig. 12*

Patented Mar. 10, 1942

2,275,779

UNITED STATES PATENT OFFICE 2,275,779

GEARSHIFT CONTROL

Earle S. MacPherson, Detroit, Mich., assignor to General Motors Corporation, Detroit, Mich., a corporation of Delaware Application May 17, 1939, Serial No. 274,141

5 Claims. (Cl. 74—477)

This invention relates to the control of the ratio changing mechanism of a motor vehicle. It is more particularly concerned with an assembly including remotely positioned means to change the ratios by which the engine drives the propeller shaft.

The objects of the invention include a simplified assembly of parts, a convenient arrangement for associating a power booster with a manually operable member and an improved arrangement within the gear box whereby frictional resistance to selection of ratios and shifting is minimized.

Other objects and advantages will be understood from the specification which follows.

On the drawings:

Figure 3 is a view in elevation partly broken away of the parts at the lower end of the steering column.

Figure 4 is a view as seen from line 4—4 of Figure 3.

Figure 5 is a view substantially as seen from line 5—5 of Figure 3.

Figure 8 is a section on line 8—8 of Figure 6.

Figure 9 is a section on line 9—9 of Figure 8.

Figure 10 is a view in elevation of a modified form of a reaction lever assembly.

Figure 11 is a section on line 11—11 of Figure 10.

Figure 12 is a section on line 12—12 of Figure 10.

Figures 1, 2:
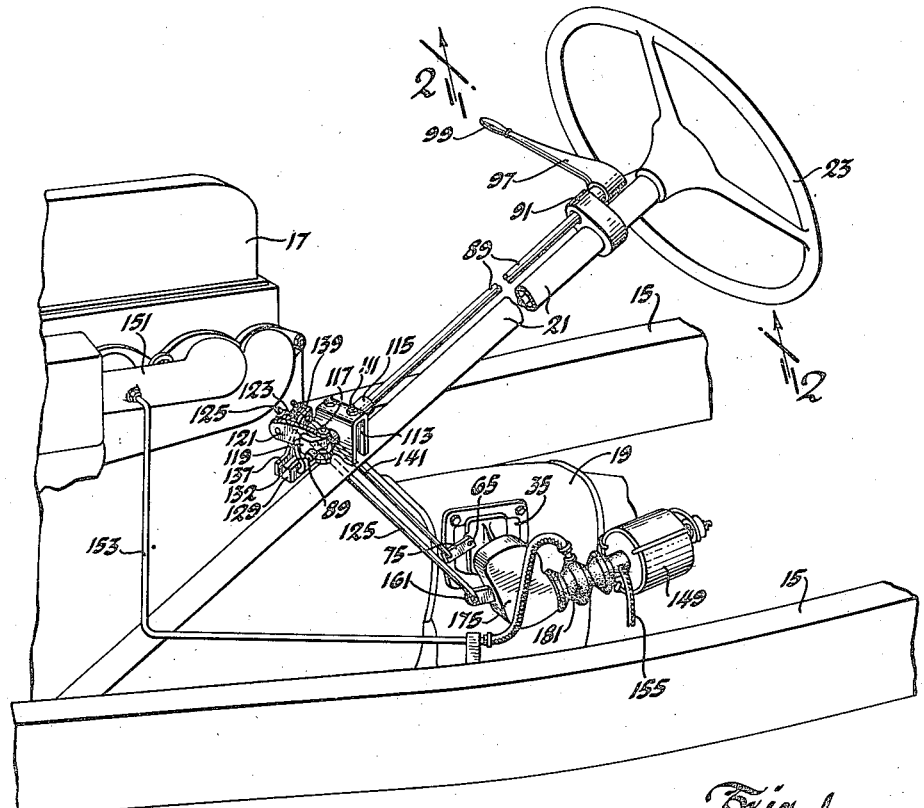
Figure 1 is a view in perspective showing the several parts in their relation to each other.
Figure 2 is a sectional view as seen from line 2—2 of Figure 1.

On Figure 1 is illustrated the frame 15 of a motor vehicle. Numeral 17 is used to designate the engine. The change speed gear box is marked 19. At 21 is a steering column and at the upper end of the column is a conventional hand steering wheel 23.

Figures 6, 7:
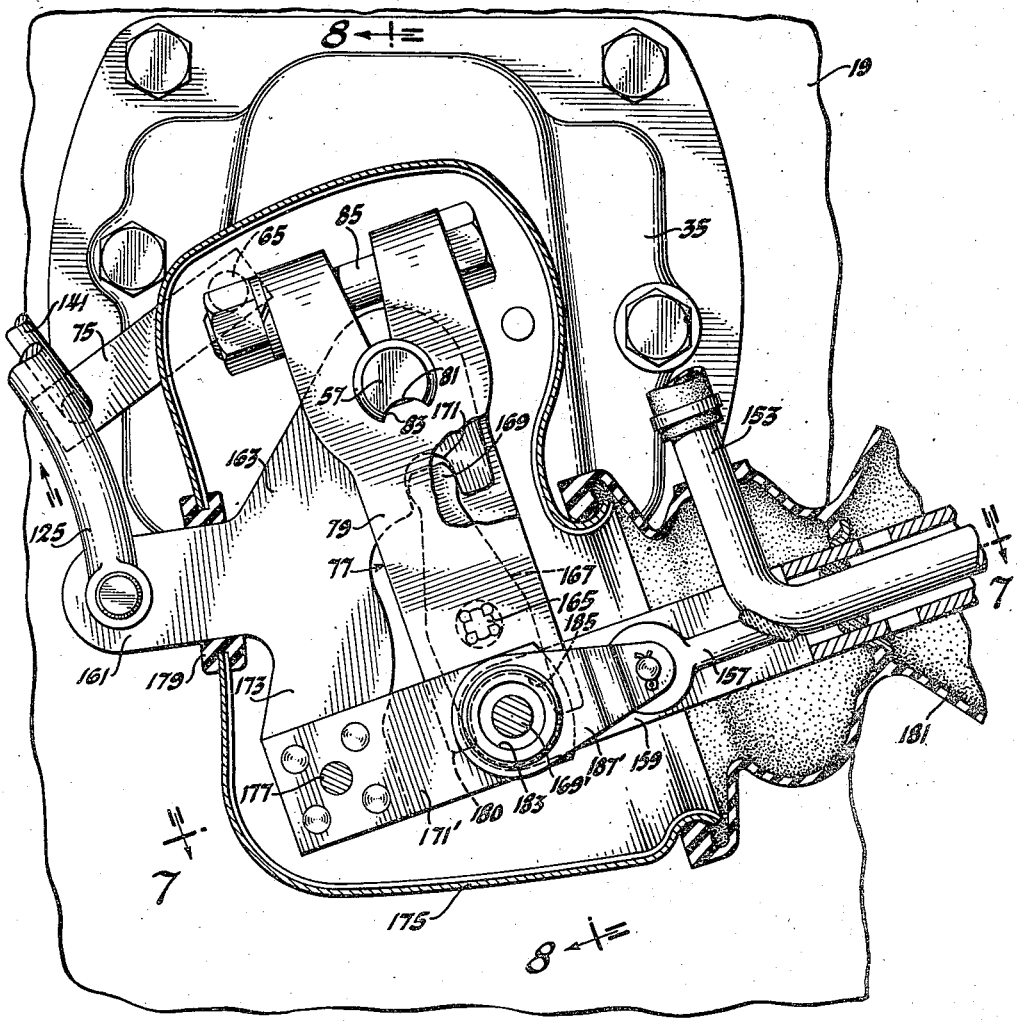
Figure 6 is a view in elevation of a reactionary lever system with parts broken away and in section.
Figure 7 is a section on line 7—7 of Figure 6.

The gear box contains ratio changing gears one of which is marked 25 in Figure 8. It is not necessary to describe the gearing further than to explain that sliding shifting members 27 and 29 are used, these shifting members having arms 31 and 33 extending transversely of the gear box and operable to reciprocate the gears and clutches. The members 27 and 29 are arranged in superposed relation and located at one side of the housing 19 adjacent a removable cover 35. A guiding member 37 of H-shape is carried preferably by the cover 35 and has upper and lower heads 39 and 41. The members 27 and 29 are shaped to slide on these heads. At a point between its ends the guide 37 has a vertical passage 43 at the ends of which are steel balls 45 pressed apart by a spring 47. The balls are adapted to enter notches 49 in the members 27 and 29 corresponding to the neutral and active positions of each shifting member. Each shifting member is provided with a pin 51. The pins engage internal notches 53 of a floating lever 55. Journaled in the cover 35 is a shaft 57. Within the gear box the shaft 57 has an arm 59 from which projects a pin 61 entering an opening at an intermediate part of lever 55. A spring 63 holds the lever in position on the pins 51. Rocking of shaft 57 is intended to rock the lever 55 about one or the other of the pins 51 to the end of moving the shifting member which carries the other pin. This action requires that one or the other of the shifting members be locked from reciprocation so that its pin may serve as a pivot for the lever 55. To lock one or the other of the members 27 or 29, the following provision is made. Journaled in the cover 35 is a rockshaft 65. It has an inner lever arm 67 from the end of which extends a pin 69 adapted to enter one or the other of notches 71 and 73 in the shifting members 27 and 29. The rockshaft 65 has an external lever arm 75. When the terminal pin 69 is in notch 73 as shown in Figure 8, rotation of shaft 57 will rock lever 55 about the lower pin 51 and the upper shift member 27 will be reciprocated from a neutral to one or the other of its active positions depending upon the direction of rotation of shaft 57. When member 27 is locked by the pin 69 the rotation of shaft 57 will reciprocate member 29. Rocking of shaft 57 is effected by the use of an external arm 77. This arm is formed by two parallel parts 79 having integral keys 81 received in a keyway 83 of the shaft. The upper ends of parts 79 above the shaft are split and a clamping bolt 85 secures the arm to the shaft. This is shown in Figure 6.

Just beneath the steering wheel is a lever 87. This lever moves in one plane, the plane of the paper in Figure 2, to rockshaft 65 and thereby lock from reciprocation one or the other of the shift members 27 or 29. This same lever 87 is adapted to swing about an axis parallel with the steering column to rock shaft 57 and make the reciprocating movements of members 27 or 29. Lever 87 extends at substantially a right angle to and may be integral with a shaft 89 which extends along the steering column. At its upper end shaft 89 is mounted for rotation and reciprocation in a bracket 91 carried by the steering column. A sleeve 93 shaped as best shown in Figure 2 is rotatable within bracket 91, there being a threaded connection at 95 affording the rotatable relation. A hollow arm 97 houses the upper end of shaft 89 and the lever 87. It terminates in a hand grip 99. Within the hollow arm is an enlargement 101 on the lever 87, the enlargement filling the space within the arm. A pin 103 pivotally connects arm 97 with the sleeve 93. A spring 105 has an intermediate coil 107, an end 109 seated in a notch of sleeve 93 and another end bent to fit lever 87 adjacent the enlargement 101. The tension of this spring biases the lever 87 and with it the arm or sleeve 97 to a downward position. A lifting movement given hand grip 99 causes a rocking movement of sleeve 97 about its pivot 103. This movement causes the enlargement 101 to rise and thus forces an upward vertical reciprocation of shaft 89. Rotary movements of the hand grip in one direction or the other about the axis of shaft 89 cause shaft 89 to rotate.

At a position on the steering column beneath the floor of the driving compartment there is secured to the steering column by a U-bolt 111, a U-shaped plate 113. This plate carries a sleeve 115 for rotatably and reciprocably carrying the lower part of shaft 89. A clamping bolt 117 secures to the end of shaft 89 a hub from which project a pair of arms 119 and 121. Arm 119 is short and arm 121 is relatively long as will be seen by reference to Figure 4. Long arm 121 has a block 123 swivelled thereto and to this block is secured the end of a rod 125 whereby rotation of shaft 89 functions to reciprocate in one direction or the other the rod 125. The U-shaped plate 113 is formed with an integral extension 127. This extension supports a block 129 which is formed at one end with a passage 131 for the rotatable support of a pin 132. The pin has an arm 133 terminating in a bent end 135 which is positioned between the two arms 119 and 121. In consequence of this construction reciprocation of shaft 89 rotates the pin 132 in its bearing 131. Beyond the bearing a lever arm 137 is fixedly secured to the pin. To its end is swivelled a block 139 carrying the end of a rod 141. By this arrangement reciprocation of rod 141 is effected by up and down movements of shaft 89. To bias the shaft 89 to its downward position there is used a spring 143 seated against the bracket 113 and also against a cup 145 engaging any suitable abutment on shaft 89. An anti-rattling spring 147 may also be used on pin 132 between the journal and an abutment 149 carried by the pin.

Adjacent the change speed transmission cover 35 the lever arm 75 extending from rockshaft 65 is connected to the end of rod 141. It will therefore be understood that hand lever 97 is normally held in its lower position in which position the connections including rod 141 operate to lock from reciprocation the shifting member 29 which controls low speed and reverse. Rocking of lever 77, therefore, functions to make shifts to high speed or second speed. If it be desired to shift into low speed or reverse, the hand grip 99 is lifted and the connections including rod 141 operate to lock the shifting member 27 which controls high speed and second speed. Thereafter rotation of shaft 57 by its lever 77 makes shifts from neutral to low or reverse depending upon the direction of rotation of shaft 57. The springs 105 and 145 bias the lever 87 and shaft 89 to a position wherein rotation of the hand grip controls high speed and second speed.

Rod 125 might be connected directly to lever 77 and the shifting movements would then be made solely by manual effort. To reduce the required manual effort it is proposed to employ a servo device to relieve the operator in large measure of the effort which would otherwise be required. A substantially conventional vacuum cylinder is designated on the drawings by numeral 149. It has as usual a piston not shown which may move in either direction of the axis of the cylinder under the influence of a suitable valve, also not shown, by which subatmospheric pressure from the engine manifold 151 is made use of by a connecting conduit 153. Jointly with the opening of the space on one side of the piston to the conduit 153 by the control valve, the other side of the piston is to be evacuated and for this purpose it is arranged to communicate with the atmosphere by pipe 155. No novelty is herein claimed for the vacuum cylinder nor for its controlling valve. No further description need be given except to state that the valve is controlled by a rod 157 reciprocable in one direction or the other and that the valve so controls the movements of the piston as to cause movements of piston rod or link members 159.

Rod 125 is connected to a branch 161 of a lever 163 which is rotatably supported on shaft 57 between the arms 79 of lever 77 as shown in Figure 8. A pivot 165 on lever 77 rotatably carries a lever 167. Lever 167 has a rounded upper end 169 socketed in a recess 171 of lever 163. Through the lower end of lever 167 and also through the ends of piston rod links 159 is a pin 169'. A pair of plates 171, 171' are secured together and to the opposite sides of a second branch 173 of lever 163. A protecting housing 175 may also be used. As shown in Figure 8 it has an opening surrounding shaft 57 and is secured to lever 163 by a bolt 177. A rubber ring 179 surrounds the branch 161 where it projects through the wall of housing 175. Connected to the housing and to the vacuum cylinder is a bellows 181 of rubber or the like. The ends of plates 171, 171' remote from their connection with lever branch 173 have registering openings 183, 183'. These openings surround the pin 169' but are dimensioned to afford a clearance relative to the pin. The lower extremities 180 of arms 79 of lever 77 are slotted as shown at 185 in Figure 8 to form forks and the forks straddle the pin 169 in spaced relation thereto. When shaft 89 is rotated in one direction or the other it reciprocates rod 125 in one direction or the other as explained above. To simplify the explanation it may be assumed that rod 125 is moved in the direction indicated by the arrow in Figure 6. Such a movement rotates lever 163 clockwise about shaft 57. In doing so, plates 171, 171' are moved to the left (Figure 7). The connections 187, 187' between the members 171, 171' and the valve rod 157 serve to open the valve and cause the piston within cylinder 149 to move in such a direction as to occasion a movement of the piston rod arms 159 to the left. Since the arms 159 are connected to pin 169' the latter is moved to the left. This movement of pin 169' tends to rotate lever 167 clockwise about its pivot 165 and thereby tends to rotate lever 163 counterclockwise about shaft 57 owing to the connection at 169. The attempt to rotate lever 163 counterclockwise is opposed by manual effort operating through rod 125 and tending to rotate lever 163 in a clockwise direction. The leverage through which the manual effort operates is such that a slight pull on the rod manually will balance a considerable effort asserted by the power cylinder tending to rotate the lever 163 in the opposite direction. The balance of the two forces serves to lock 167 to lever 77 and the combined manual and power forces thereby rotate shaft 57 in a clockwise direction. As the piston so moves, its relation to the valve mechanism is changed as to close the valve and a further pull on rod 125 is required to continue the rotation of shaft 57. There is thus present the well-known "follow-up" action. In this way the manual effort is of the same kind but of less degree than if it operated as the sole source of shifting. Since the effort required of the operator to prevent the rotation of lever 167 is much less than force exerted by the power cylinder the operator is required to perform only a small part, perhaps 20% of the work of shifting. It will be understood that a movement of rod 125 in a direction the reverse of that shown by the arrow is effected by an opposite rotation of hand lever 79 and that it reciprocates the shifting members and the gear box in the opposite direction. In the event of failure of the power source the members 171 and 171' directly contact the pin 169 and the shift is made solely by manual effort.

Figures 10, 11 and 12 show a modified form which the reaction lever may assume. In this modified form, shaft 57 has secured thereto a lever 177. To the lever 177 there is pivoted at 179 a lever 181, the latter having a forked end at 183 for straddling shaft 57 with a suitable clearance. Also pivoted to lever 177 at 185 is a lever 187 having an end 189 received in a recess 191 of lever 181. Rod 125 is connected by a yoke 193 to lever 181 at 195. A pair of links 197 are also connected to lever 181. These links are connected to the valve operating rod 157. The links have slots 199 straddling a pin 201 which connects the ends of the piston rod links 203 to an arm 205 of lever 187. There may be a housing 207 and a rubber guard 209 to protect the operating parts as before. In this form of the invention the operation is substantially the same. A movement of rod 125 in the direction of the arrow causes lever 181 to rock in a clockwise direction about its pivot 179. In doing so it tends to close the gap between the forks of lever 181 and the shaft 57. If there is no power available it actually does close the gap and operates by manual effort alone to rotate shaft 57. If the servo power is available the aforesaid rotation of lever 181 opens the valve through the instrumentality of links 197 and then the piston of the power cylinder moves in a direction such that the rods 203 move to the left. Such a movement tends to turn lever 187. Any turning of 187 would occasion a counterclockwise rotation of lever 181. This is, however, resisted by a manual pull on rod 185. The parts are therefore in effect locked together and shaft 57 is rotated. The movement intermittently closes the valve as the piston moves and the continuous rotation of shaft 57 requires a continued pull on rod 125. There is, therefore, in this form of the invention the same reaction effect and the same "follow-up" action.

The simple means for locking one of the slidable shifting members very largely eliminates friction in the gear box, an object clearly to be desired in a remote control for ratio changing. The simplified form of reactionary lever involves a considerable economy in production.

I claim:

1. In a ratio changing mechanism, a housing, a longitudinally extending guide with upper and lower flanges, each with extensions on opposite sides of the vertical plane of the guide, vertically spaced shifting members each embracing the two extensions of one of said flanges and slidable relative thereto, said shifting members carrying projecting arms to engage slidable members of said transmission.

2. In a ratio changing mechanism, a housing, a longitudinally extending guide having vertically disposed flanges, vertically disposed shifting members slidable along said flanges, said shifting members carrying projecting arms to engage slidable members of said transmission, said guide having an intermediate vertical passage and detent devices in said passage for said shifting members.

3. In a ratio changing mechanism, a housing, a longitudinally extending guide having vertically disposed flanges, vertically disposed shifting members slidable along said flanges, said shifting members carrying projecting arms to engage slidable members of said transmission, each of said shifting members having a pin, a lever having terminal openings receiving said pins, means to lock either of said shifting members from reciprocation on its flange and means to rock said lever about the pin of the locked shifting member.

4. In a ratio changing mechanism, a housing, a longitudinally extending guide having vertically disposed flanges, vertically disposed shifting members slidable along said flanges, said shifting members carrying projecting arms to engage slidable members of said transmission, each of said shifting members having a pin, a lever having terminal openings receiving said pins, means to lock either of said shifting members from reciprocation on its flange and means to rock said lever about the pin of the locked shifting member, said locking means comprising a rockshaft rotatably supported in said housing, said rockshaft having a crankpin adapted to engage a notch in one or the other of said shifting members and remotely positioned means to rotate said rockshaft.

5. In a ratio changing mechanism, a housing, a longitudinally extending guide having vertically disposed flanges, vertically disposed shifting members slidable along said flanges, said shifting members carrying projecting arms to engage slidable members of said transmission, each of said shifting members having a pin, a lever having terminal openings receiving said pins, means to lock either of said shifting members from reciprocation on its flange and means to rock said lever about the pin of the locked shifting member, said lever rocking means being a shaft journalled for rotation in said housing, said shaft having a crank arm and pin, said lever having an opening to receive said crankpin, and remotely positioned means to rotate said shaft.

EARLE S. MACPHERSON.